(12) United States Patent
Zhang et al.

(10) Patent No.: US 9,112,652 B2
(45) Date of Patent: Aug. 18, 2015

(54) LOCKING DETECTION CIRCUIT FOR CDR CIRCUITS

(71) Applicant: IPGoal Microelectronics (Sichuan) Co., Ltd., Chengdu (CN)

(72) Inventors: Ziche Zhang, Chengdu (CN); Zhengxian Zou, Chengdu (CN)

(73) Assignee: IPGOAL MICROELECTRONICS (SICHUAN) CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/448,262

(22) Filed: Jul. 31, 2014

(65) Prior Publication Data

US 2015/0200766 A1    Jul. 16, 2015

(30) Foreign Application Priority Data

Jan. 15, 2014    (CN) .......................... 2014 1 0019184

(51) Int. Cl.
*H04L 7/04* (2006.01)
*H04L 7/00* (2006.01)

(52) U.S. Cl.
CPC .................................. *H04L 7/0037* (2013.01)

(58) Field of Classification Search
USPC .................................. 375/355; 327/39, 20, 12
See application file for complete search history.

(56) References Cited

U.S. PATENT DOCUMENTS

| 5,530,383 | A  | * | 6/1996  | May .................................. 327/39 |
| 8,040,156 | B2 | * | 10/2011 | Lee et al. .......................... 327/20 |
| 2014/0203842 | A1 | * | 7/2014 | Maruko ............................. 327/12 |

* cited by examiner

*Primary Examiner* — Eva Puente
(74) *Attorney, Agent, or Firm* — Shimokaji & Associates, P.C.

(57) ABSTRACT

A locking detection circuit for CDR circuits includes a first frequency divider, a second frequency divider, a first sampler, a second sampler, and a locking detector, with a data signal outputted by a CDR circuit being inputted to the first frequency divider and the first sampler respectively, the first frequency divider being connected with the first sampler, a clock pulse outputted by the CDR circuit being inputted to the second frequency divider and the second sampler respectively, output terminals of the first and second samplers being connected with the locking detector which is for detecting if rising edges of the data signal outputted and the clock pulse outputted are aligned, and then outputting a detection result. The circuit size and power consumption is reduced, and it is applicable to spread spectrum carrier with high data rate over 1 Gbps and with any protocol, whose application scope is broadened.

6 Claims, 4 Drawing Sheets

LOCKING DETECTION CIRCUIT FOR CDR CIRCUITS

RELATED APPLICATIONS

This application claims the benefit of priority to Chinese Patent Application No. 201410019184.6, filed on Jan. 15, 2014, which is hereby incorporated by reference in its entirety.

FIELD OF THE INVENTION

The present invention relates to technical field of integrated circuits and, more particularly to a locking detection circuit for CDR (Clock Data Recovery) circuits.

BACKGROUND OF THE INVENTION

Conventional locking detection circuit for CDR (Clock Data Recovery) circuits has two types according to two implementation ways of CDR circuit.

One is for analog CDR circuits based on PLL (Phase Locked Loop), which determines a threshold by utilizing two reference voltages and two comparators, and considers the analog CDR circuit to be locked if a control voltage of a VCO (Voltage Controlled Oscillator) in the CDR circuit is within the threshold and is unvaried for a predetermined period, contrariwise, to be unlocked. Such a locking detection circuit has following restrictions however. First, it's necessary to use simulation comparators with high accuracy and high sensitivity, which may consume size and power of the locking detection circuit. Second, after the CDR circuit is locked, the control voltage of the VCO is an analog signal, but it's hard to determine a turn threshold of the control voltage due to manufacturing process variation. Third, in the event that data signals outputted by the CDR circuit include spread spectrum data, this locking detection will be failed if the control voltage of the VCO is drifted as the spread spectrum and beyond the thresholds of the comparator.

Another is for digital CDR circuits based on phase interpolation digital filter, which outputs phase detection results including up or dn by a bang-bang Phase detector, and then performs digital filtering and counting to the phase detection results. The digital CDR circuit will be considered to be locked (namely the rising edges of the clock pulses and the data signals are aligned) if the total amount of the result of up approaches or is the same with that of the total amount of the result of dn, contrariwise, to be unlocked. Such a locking detection circuit has the following restrictions however. First, when a data rate of the data signal outputted by the CDR circuit reaches to 1 Gbps or over, this locking detection circuit will appear tight time sequence, which desires a larger size and larger power accordingly. Second, in the event that data signals outputted by the CDR circuit include spread spectrum data, it's necessary to be informed in advance that if the outputted data signals pertain to upward spread spectrum or downward spread spectrum, and the spectral distribution of the data signals, so that parameters could be determined to perform locking detection for the CDR circuit; otherwise, this locking detection will be failed.

Both of the foresaid locking detection circuits for CDR circuit are based on a specific CDR circuit, and the implementations of locking detection for CDR circuits are depended on a specific CDR circuit, which limits its application scope. Therefore, there is a need for an improved locking detection circuit for CDR circuits to overcome the above-mentioned drawbacks.

SUMMARY OF THE INVENTION

One objective of the present invention is to provide a locking detection circuit for CDR circuits, which could perform locking detection for both digital CDR circuit and analog CDR circuit, so as to reduce circuit size and power consumption; moreover, the locking detection circuit for CDR circuits is applicable to spread spectrum carrier with high data rate over 1 Gbps and with any protocol, whose application scope is broadened.

To achieve the above-mentioned objective, a locking detection circuit for CDR circuits of the present invention includes a first frequency divider, a second frequency divider, a first sampler, a second sampler, and a locking detector, with a data signal outputted by a CDR circuit being inputted to an input terminal of the first frequency divider and a clock control terminal of the first sampler respectively, an output terminal of the first frequency divider being connected with an input terminal of the first sampler, a clock pulse outputted by the CDR circuit being inputted to an input terminal of the second frequency divider and a clock control terminal of the second sampler respectively, an output terminal of the second frequency divider being connected with an input terminal of the second sampler, output terminals of both the first sampler and the second sampler being connected with the locking detector, and the locking detector being arranged for detecting if rising edges of the data signal outputted by the first sampler and the clock pulse outputted by the second sampler are aligned, and then outputting a detection result.

Preferably, the locking detector includes a third sampler, a delay module, a fourth sampler, and an XOR gate, with a clock control terminal of the third sampler being connected with the output terminal of the first sampler, and an input terminal of the third sampler being connected with the output terminal of the second sampler, the output terminals of the first and the second samplers being connected with the delay module, the data signal which is outputted by the first sampler and then delayed for one-unit delay being inputted to a clock control terminal of the fourth sampler, the clock pulse which is outputted by the second sampler and then delayed for two-unit delay being inputted to the fourth sampler, output terminals of both the third sampler and the fourth sampler being connected with an input terminal of the XOR gate, and the detection result being outputted by the XOR gate.

Preferably, the delay module includes a first delay unit, a second delay unit, and a third delay unit, each of which is connected with an outer control terminal to control delay time of one-unit delay for each said delay unit, and an input terminal of the first delay unit is connected with the output of the first sampler, an output terminal of the first delay unit connected with the clock control terminals of the third and the fourth samplers, the second delay unit is connected with the third delay unit in turn, an input terminal of the second delay unit is connected with the output terminal of the first sampler, and an output terminal of the third delay unit is connected with an input terminal of the fourth sampler.

Preferably, it further includes a digital filter, and an input terminal of the digital filter being connected with an output terminal of the XOR gate, a clock control terminal of the digital filter being inputted with the clock pulse outputted by the CDR circuit.

Preferably, it further includes an outer control terminal which is connected with the first delay unit, the second delay unit, and the third delay unit respectively, to control delay time of one-unit delay for each said delay unit.

In comparison with the prior art, since the locking detection circuit for CDR circuits of the present invention includes a first frequency divider and a second frequency divider which are used for dividing frequencies of the data signals and the clock pulses outputted by the CDR circuit, thus modulated signals outputted by CDR circuit could be detected by the locking detection circuit for CDR circuits according to the present invention. Moreover, the locking detection circuit for CDR circuits according to the present invention is set outside of the CDR circuit, whose locking detection process is independent from the CDR circuit, so that it's applicable to both digital CDR circuit and analog CDR circuit to broaden its application scope.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
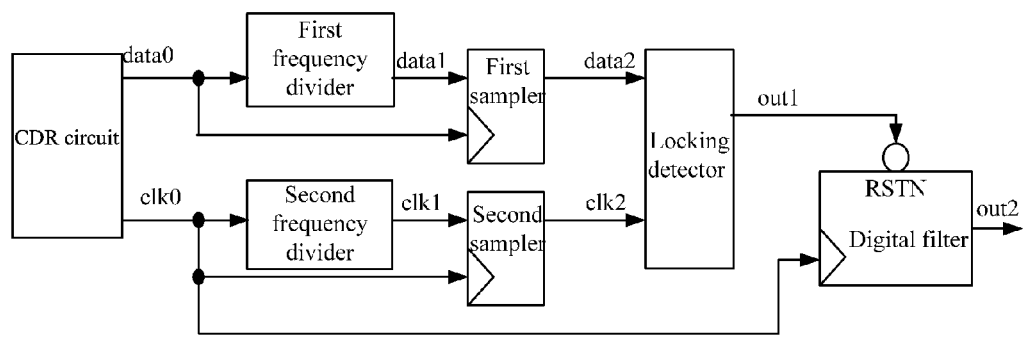
FIG. 1 is a schematic view of a locking detection circuit for CDR circuits according to one embodiment of the present invention.

Various preferred embodiments of the invention will now be described with reference to the figures, wherein like reference numerals designate similar parts throughout the various views. As indicated above, the invention is directed to a locking detection circuit for CDR circuits, which could perform locking detection for both digital CDR circuit and analog CDR circuit, so as to reduce circuit size and power consumption; moreover, the locking detection circuit for CDR circuits is applicable to spread spectrum carrier with high data rate over 1 Gbps and with any protocol, whose application scope is broadened.

Figure 2:
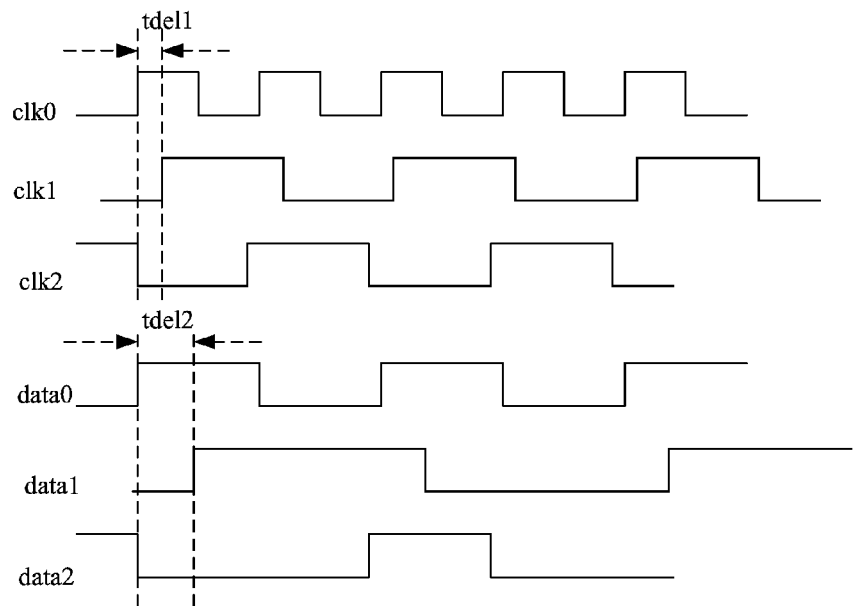
FIG. 2 shows oscillograms of the data signals and clock pulses outputted by the CDR circuit, before a locking detector is inputted.
Figure 3:
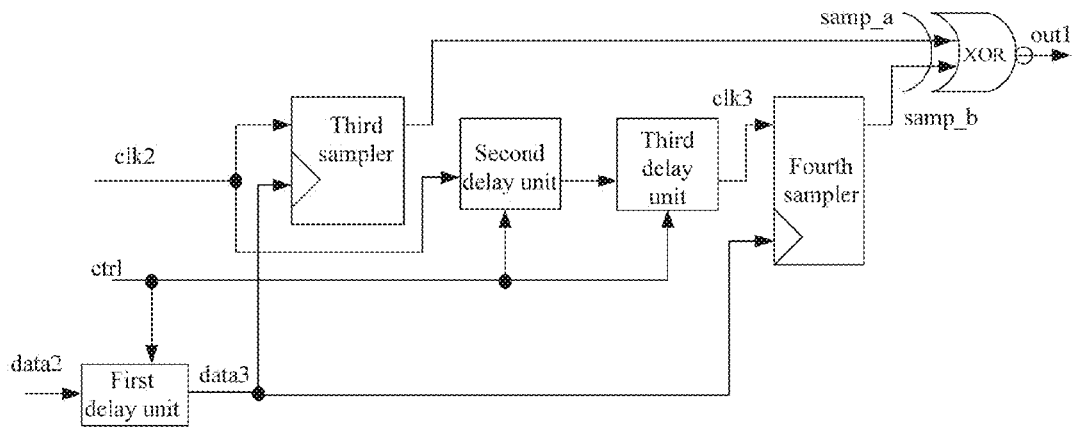
FIG. 3 is a circuit diagram of the locking detector.

Referring to FIGS. 1 and 2, the locking detection circuit for CDR circuits of the present invention includes a first frequency divider, a second frequency divider, a first sampler, a second sampler, and a locking detector. A data signal data0 outputted by a CDR circuit is inputted to an input terminal of the first frequency divider and a clock control terminal of the first sampler respectively, and an output terminal of the first frequency divider is connected with an input terminal of the first sampler, so that the high-frequency data signal data0 may be divided by the first frequency divider, and then a data signal data1 which has a lower frequency can be obtained, which helps the first sampler to sample the data signal. As shown in FIG. 2, the rising edge of the data signal data1 that is obtained by dividing is delayed by comparison with the data signal data0 that is not divided, and tdel2 labeled in the figure illustrates the delay time. The clock control terminal of the first sampler is inputted with the data signal data0, so that the first sampler may sample the data signal data1 before the rising edge of the data signal data0 reaches, as a result that the rising edge of the sampled data signal data2 will be aligned with that of the data signal data0 (as illustrated in FIG. 2), thereby ensuring the accuracy of the detection result. A clock pulse clk0 outputted by the CDR circuit is inputted to an input terminal of the second frequency divider and a clock control terminal of the second sampler respectively, and an output terminal of the second frequency divider being connected with an input terminal of the second sampler, so that the high-frequency clock pulse clk0 may be divided by the second frequency divider, and then a clock pulse clk1 having lower frequency can be obtained, which helps the second sampler to sample the clock pulse. As shown in FIG. 2, the rising edge of the clock pulse clk1 that is obtained by dividing is delayed by comparison with the clock pulse clk0 that is not divided, and tdel1 labeled in the figure illustrates the delay time. The clock control terminal of the second sampler is inputted with the clock pulse clk0, so that the second sampler may sample the clock pulse clk1 before the rising edge of the clock pulse clk0 reaches, as a result that the rising edge of the sampled clock pulse clk2 will be aligned with that of the clock pulse clk0 (as illustrated in FIG. 2). By this token, the locking detection circuit for CDR circuits of the present invention can detect various high-frequency signals by the first and the second frequency dividers, and the frequency dividing ratio thereof can be set according to the specific signal frequency outputted by the CDR circuit. Output terminals of both the first sampler and the second sampler are connected with the locking detector, and the locking detector will detect the alignment between the rising edge of the data signal data2 outputted by the first sampler and the rising edge of the clock pulse clk2 outputted by the second sampler, and then output a detection result out1. In addition, preferably, the locking detection circuit for CDR circuits may further include a digital filter, whose input terminal is connected with the output terminal of the locking detector, and whose clock control terminal is inputted with the clock pulse clk0. By such a digital filter, possible jitter or burr in the detection result out1 outputted by the locking detector can be filtered, so as to output a stable detection result out2.

Figure 4:
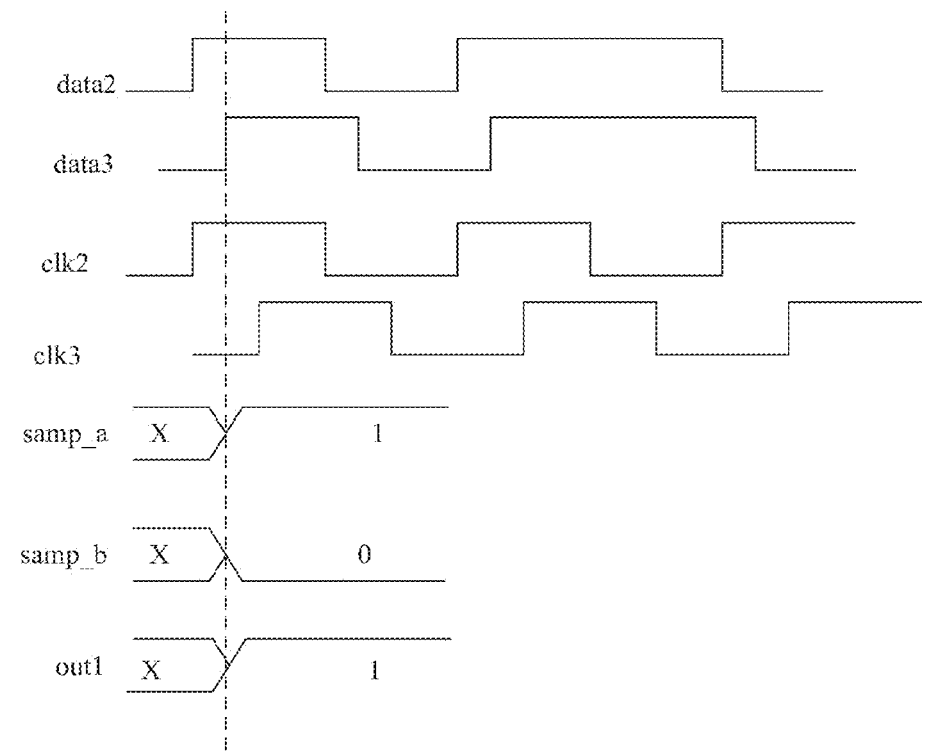
FIG. 4 shows oscillograms of the data signals and clock pulses outputted by the CDR circuit, after flowing through the locking detector while their rising edges are aligned.
Figure 5:
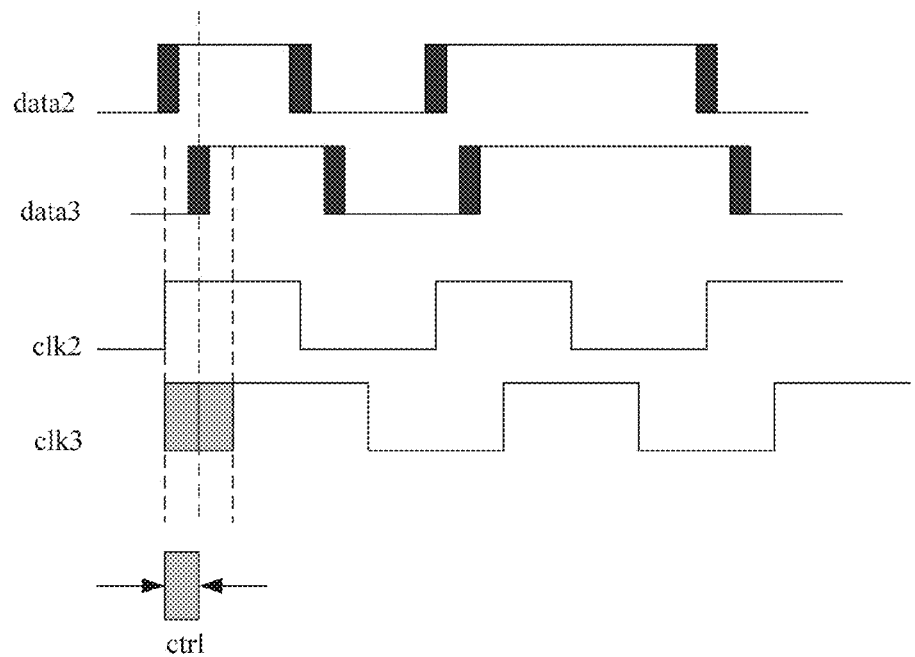
FIG. 5 shows oscillograms of the outputted signals of the locking detector of FIG. 4, in case of possible jitter.
Figure 6:
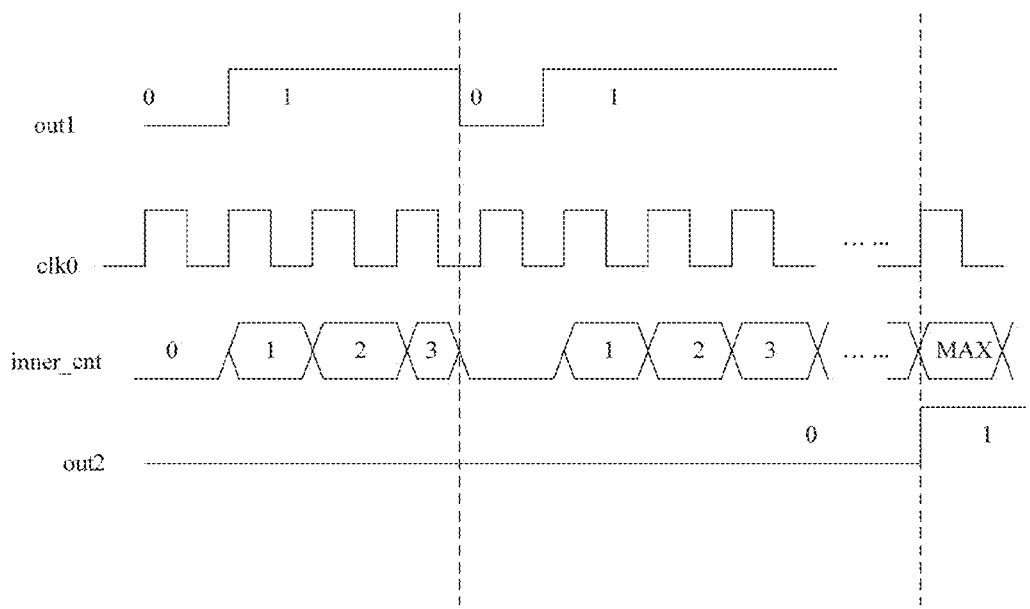
FIG. 6 shows oscillograms of the outputted signals of the locking detector of FIG. 5, after flowing through the digital filter.

Specifically, as shown in FIGS. 3-6, the locking detector includes a third sampler, a delay module, a fourth sampler, and an XOR gate. Preferably, the delay module includes a first delay unit, a second delay unit, and a third delay unit. A clock control terminal of the third sampler is connected with the output terminal of the first sampler, and the first delay unit is connected between the clock control terminal of the third sampler and the output terminal of the first sampler, that is, the data signal data2 outputted by the first sampler is delayed through the first delay unit and then outputted as a data signal data3 which is delayed for one-unit delay by comparison with the data signal data2. The input terminal of the third sampler is connected with the output terminal of the second sampler, so that the third sampler may sample high level of the clock pulse clock clk2 outputted by the second sampler while the data signal data3 outputted by the first delay unit reaches its rising edge, and then output a signal samp_a. Furthermore, the output terminal of the second sampler is connected with the input terminal of the second delay unit, the input terminal of the third delay unit is connected with the output terminal of the second delay unit, and the output terminal of the third delay unit is connected with the input terminal of the fourth sampler. The second and the third delay units will delay the signals that are inputted thereto for one-unit delay. As a result, the clock pulse clk2 outputted by the second sampler is delayed for two-unit delay after flowing through the second and the third delay units to become the clock pulse clk3 (as shown in FIG. 4). Because the data signal data3 outputted by the first delay unit is inputted to the clock control terminal of the fourth sampler, thus the fourth sampler will output a signal samp_b after sampling low level of the clock pulse clk3 while the data signal data3 reaches its rising edge. As mentioned above, the clock pulse clk3 is delayed for two-unit delay by comparison with the clock pulse clk2, and the clock control terminals of the third and the fourth samplers are inputted with the data signal data3, therefore the third and the fourth samplers will respectively sample a clock pulse with different level when the data signal data3 reaches its rising edge. For example, as shown in FIG. 4, the third sampler samples high level of the clock pulse clk2, while the fourth sampler samples low level of the clock pulse clk3, so that the rising edge of the output signal samp_a is aligned with that of the data signal data3, which is illustrated as "1" shown in FIG. 4 accordingly; the falling edge of the output signal samp_b is aligned with the rising edge of the data signal data3, which is illustrated as "0" shown in FIG. 4. Specifically, the output terminals of the third and the fourth sampler are connected with the input terminal of the XOR gate, by which the signals samp_a and samp_b inputted to the XOR gate are carried out logic XOR to produce the detection result out1 which demonstrates if the data signal data0 is aligned with the clock pulse clk0. During the detection process for the data signal data0 and the clock pulse clk0, this detection result out1 may be inaccurate due to the jitter and burr of the output signal (as shown in FIG. 5) caused by some other factors. As a modification, the output terminal of the XOR gate is connected with a digital filter in which a count signal inner_cnt is set, thereby the digital filter will count the inputted signal out1 according to a count depth MAX of the count signal inner_cnt, concretely, a signal out2 will be outputted as "1" only if the duration of the signal out1 outputted as "1" reaches to the count depth MAX; otherwise, the count signal inner_cnt will be cleared and count afresh if the signal out1 jumps to "0" at any time during the count depth MAX. In such a way, possible jitter or burr in the detection result out1 outputted by the locking detector can be filtered, to output a stable detection result out2, as shown in FIG. 6. Concretely, the count depth of the count signal inner_cnt may be set according to the accuracy demand of the locking detection circuit, and the accuracy of the detection result out2 will be higher if the value of the count depth MAX is larger. In a preferable embodiment, an outer control terminal is connected with the first, the second and the third delay units respectively, to control their delay time for one-unit delay for each delay unit. Apparently, the delay time is set according to the frequency of the signal outputted by the CDR.

Working principle of the locking detection circuit for CDR circuits of the present invention will be described by combination with FIGS. 1-8 as following.

Figure 7:
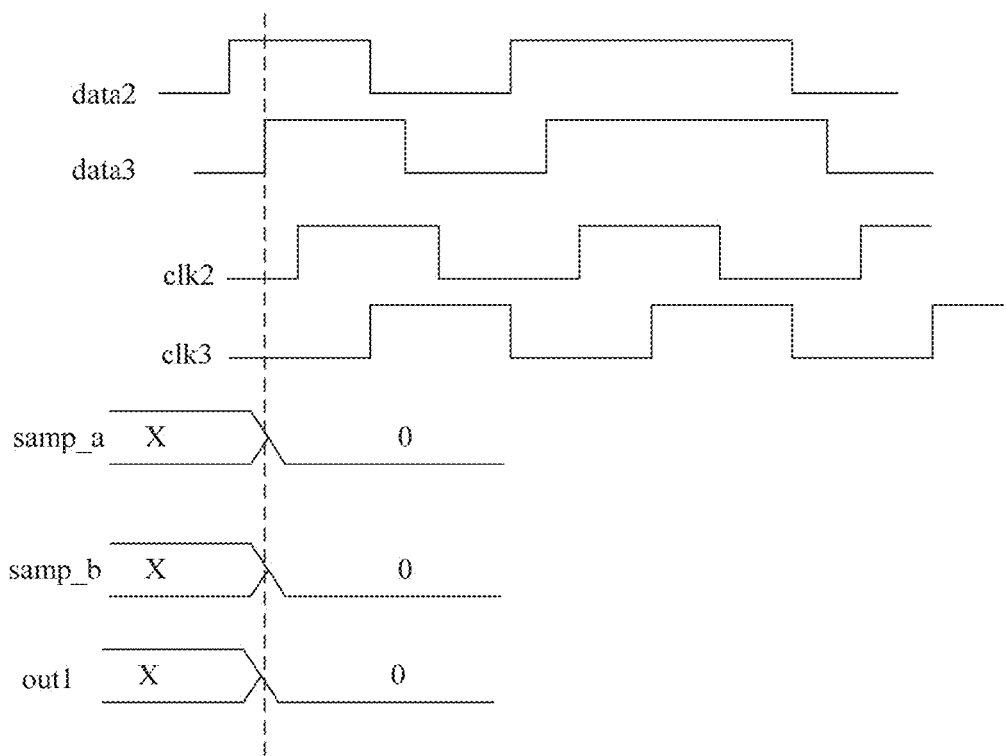
FIG. 7 shows oscillograms of the data signal and clock pulse outputted by the CDR circuit, after flowing through the locking detector while the data signal is in front of the clock pulse.
Figure 8:
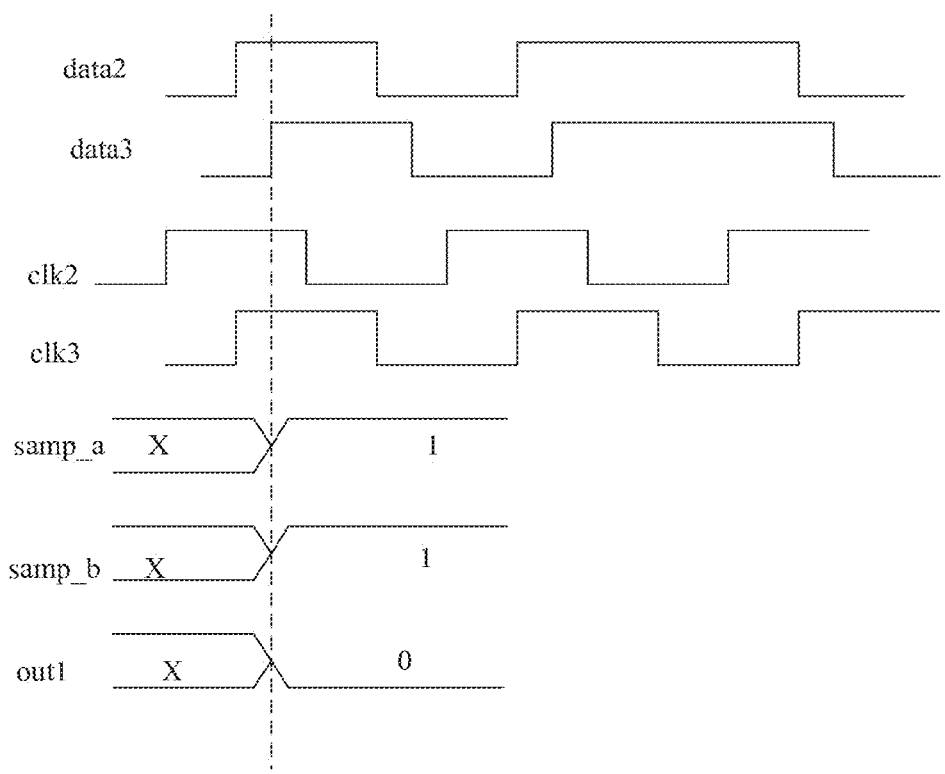
FIG. 8 shows oscillograms of the data signal and clock pulse outputted by the CDR circuit, after flowing through the locking detector while the data signal is lagged behind the clock pulse.

Firstly, the data signal data0 and the clock pulse clk0 outputted by the CDR circuit are divided respectively by the first and the second frequency dividers, and then the divided data signal data1 and the divided clock pulse clk1 are sampled by the first and the second sampler respectively to output the data signal data2 and the clock pulse clk2, then the data signal data2 is delayed by the first delay unit for one-unit delay to obtain the data signal data3 which is to be inputted to the clock control terminals of the third and the fourth samplers. As a result, the third sampler samples the clock pulse clock clk2 while the data signal data3 reaches its rising edge, and then output the signal samp_a which is to be inputted to the XOR gate. The clock pulse clk2 flows through the second delay unit and the third delay unit in turn to be delayed twice, and then is inputted to the input terminal of the fourth sampler, so that the clock pulse clks3 outputted is delayed for one-unit delay by comparison with the data signal data3. Then, the fourth sampler samples the data signal data3 while the data signal data3 reaches its rising edge, and then output the signal samp_b. Since the clock control terminals of both the third and the fourth samplers are inputted with the data signal data3, and the clock pulse clk3 is delayed for two-unit delay by comparison with the clock pulse clk2, therefore clock pulses obtained by the third and the fourth samplers have different levels when the rising edges of the data signal data0 and the clock pulse clk0 outputted by the CDR circuit are aligned, as shown in FIG. 4, for example, the third sampler samples high level of the clock pulse clk2, while the fourth sampler samples low level of the clock pulse clk3, by this token, the rising edge of the data signal data3 is aligned with the rising edge of the signal samp_a and the falling edge of the signal samp_b. And the signals samp_a and samp_b are flowed through the XOR gate to output the detection result out1 which is to be filtered by the digital filter to output the stable detection result out2 finally. Specifically, since the signal samp_a and the signal samp_b are different when the rising edge of the data signal data0 is aligned with that of the clock pulse clk0, thus the detection result out1 outputted by the XOR gate is "1", such a detection result of "1" proves that the rising edges of the data signal data0 and the clock pulse clk0 are aligned (as shown in FIG. 4), otherwise, no alignment appears. As shown in FIG. 7, when the data signal data0 is in front of the clock pulse clk0, both the third sampler and the fourth sampler will sample the low levels of the clock pulse, and both the signal samp_a and the signal samp_b are "0", and finally the detection result outputted by the XOR is "0" as well. As shown in FIG. 8, when the data signal data0 is lagged behind the clock pulse clk0, both the third sampler and the fourth sampler will sample the high levels of the clock pulses, and both the signal samp_a and the signal samp_b are "1", and finally the detection result outputted by the XOR is "0" as well.

In conclusion, the locking detection circuit for CDR circuits of the present invention may detect the locking status for both digital CDR circuit and analog CDR circuit, thus the circuit size and power consumption is reduced by comparison with the conventional one; furthermore, the locking detection circuit for CDR circuits includes a first frequency divider and a second frequency divider for dividing frequencies of signals, thus the locking detection process may be applicable to spread spectrum carrier with high data rate over 1 Gbps and with any protocol, which brings a broadened application scope.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A locking detection circuit for CDR (clock data recovery) circuits, comprising a first frequency divider, a second frequency divider, a first sampler, a second sampler, and a locking detector, with a data signal outputted by a CDR circuit being inputted to an input terminal of the first frequency divider and a clock control terminal of the first sampler respectively, an output terminal of the first frequency divider being connected with an input terminal of the first sampler, a clock pulse outputted by the CDR circuit being inputted to an input terminal of the second frequency divider and a clock control terminal of the second sampler respectively, an output terminal of the second frequency divider being connected with an input terminal of the second sampler, output terminals of both the first sampler and the second sampler being connected with the locking detector, and the locking detector being arranged for detecting if rising edges of a data signal outputted by the first sampler and a clock pulse outputted by the second sampler are aligned, and then outputting a detection result.

2. The locking detection circuit for CDR circuits according to claim 1, wherein the locking detector comprises a third sampler, a delay module, a fourth sampler, and an XOR gate, with a clock control terminal of the third sampler being connected with the output terminal of the first sampler, and an input terminal of the third sampler being connected with the output terminal of the second sampler, the output terminals of the first and the second samplers being connected with the delay module, the data signal which is outputted by the first sampler and then delayed for one-unit delay being inputted to a clock control terminal of the fourth sampler, the clock pulse which is outputted by the second sampler and then delayed for two-unit delay being inputted to the fourth sampler, output terminals of both the third sampler and the fourth sampler being connected with an input terminal of the XOR gate, and the detection result being outputted by the XOR gate.

3. The locking detection circuit for CDR circuits according to claim 2, wherein the delay module comprises a first delay unit, a second delay unit, and a third delay unit, each of which is connected with an outer control terminal to control delay time of one-unit delay for each said delay unit, and an input terminal of the first delay unit is connected with the output of the first sampler, an output terminal of the first delay unit connected with the clock control terminals of the third and the fourth samplers, the second delay unit is connected with the third delay unit in turn, an input terminal of the second delay unit is connected with the output terminal of the first sampler, and an output terminal of the third delay unit is connected with an input terminal of the fourth sampler.

4. The locking detection circuit for CDR circuits according to claim 2, further comprising a digital filter, and an input terminal of the digital filter being connected with an output terminal of the XOR gate, a clock control terminal of the digital filter being inputted with the clock pulse outputted by the CDR circuit.

5. The locking detection circuit for CDR circuits according to claim 3, further comprising a digital filter, and an input terminal of the digital filter being connected with an output terminal of the XOR gate, a clock control terminal of the digital filter being inputted with the clock pulse outputted by the CDR circuit.

6. The locking detection circuit for CDR circuits according to claim 3, further comprising an outer control terminal which is connected with the first delay unit, the second delay unit, and the third delay unit respectively, to control delay time of one-unit delay for each said delay unit.

\* \* \* \* \*